United States Patent
Eichenauer

(10) Patent No.: US 6,767,963 B1
(45) Date of Patent: Jul. 27, 2004

(54) THERMOPLASTIC MOULDING MATERIALS BASED ON SPECIAL HIGHLY EFFECTIVE GRAFTED POLYMER COMPONENTS

(75) Inventor: Herbert Eichenauer, Dormagen (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/743,233

(22) PCT Filed: Jul. 5, 1999

(86) PCT No.: PCT/EP99/04652

§ 371 (c)(1),
(2), (4) Date: Jan. 8, 2001

(87) PCT Pub. No.: WO00/04068

PCT Pub. Date: Jan. 27, 2000

(30) Foreign Application Priority Data

Jul. 15, 1998 (DE) .......................... 198 31 734

(51) Int. Cl.⁷ ............................................. C08F 279/04
(52) U.S. Cl. .............................. 525/64; 525/66; 525/67; 525/70; 525/71; 525/80
(58) Field of Search .......................... 525/64, 66, 67, 525/70, 71, 80, 69

(56) References Cited

U.S. PATENT DOCUMENTS

| 3,542,905 A | 11/1970 | Nishioka et al. ............ 260/879 |
| 4,652,614 A | 3/1987 | Eichenauer et al. .......... 525/71 |
| 5,298,563 A | 3/1994 | Ishiga et al. ................. 525/245 |
| 5,668,218 A | 9/1997 | Eichenauer et al. ......... 525/265 |
| 5,723,540 A | 3/1998 | Eichenauer et al. .......... 525/78 |

FOREIGN PATENT DOCUMENTS

| EP | 0 678 531 | 10/1995 |
| GB | 1255797 | 12/1971 |
| JP | 06010230 | * 2/1994 |

OTHER PUBLICATIONS

Caplus AN 1985:407236, abstracting JP06010230.*

* cited by examiner

Primary Examiner—Jeffrey Mullis
(74) Attorney, Agent, or Firm—Joseph C. Gil; Aron Preis

(57) ABSTRACT

A thermoplastic molding composition of the ABS type is disclosed. The composition that contains an elastic-thermoplastic graft polymer and a copolymer comprising styrene and acrylonitrile, is characterized in that the graft polymer is a product of radical emulsion polymerization process that is initiated by a combination of a persulfate compound and at least one azo compound and in that a first mixture that contains said azo compound and a first amount of monomers is fed in to a rubber in latex form and in a subsequent reaction step a second mixture is introduced that contains the persulfate compound and a second amount of monomers.

14 Claims, No Drawings

THERMOPLASTIC MOULDING MATERIALS BASED ON SPECIAL HIGHLY EFFECTIVE GRAFTED POLYMER COMPONENTS

The present invention provides thermoplastic moulding compositions of the ABS type containing specific highly effective graft polymer components which are obtained by emulsion polymerization using specific initiator systems and observing defined reaction conditions.

Moulding compositions of the ABS type are two-phase plastics comprising

I) a thermoplastic copolymer comprising styrene and acrylonitrile, in which the styrene may be wholly or partially replaced by α-methylstyrene or methyl methacrylate; this copolymer, also known as SAN resin or matrix resin, forms the external phase;

II) at least one graft polymer which has been produced by grafting reaction of one or more of the monomers mentioned under I) on butadiene-, homo- or -copolymer ("graft base"). This graft polymer ("elastomer phase" or "graft rubber") forms the disperse phase in the matrix resin.

With identical matrix the strength of an ABS moulding composition is substantially determined by the graft rubber. For highly stressed moulded parts, however, the strength achievable with conventional ABS moulding compositions is not always sufficient with the necessary reliability, particularly when very high strengths at low temperature are also required or these requirements are only met at the expense of other equally desirable properties such as hardness or processing behaviour.

There is therefore a need for graft polymers on the basis of which ABS moulding compositions with very high strength values at room temperature and at low temperature can be produced without deterioration of the remaining properties, particularly hardness and processability.

Furthermore, it should also be possible to produce these graft rubbers on the basis of finer-particle rubber bases so that moulded parts with a high surface gloss may also be obtained if required.

It has now been found that moulding compositions of the ABS type with excellent strengths at room temperature and low temperature are obtained without serious losses as regards the other properties if the graft polymer used is produced using specific combinations of initiator systems and observing defined reaction conditions.

The production of graft rubbers using various initiator systems is known. Numerous documents including EP-A 154 244, for example, describe the use of potassium persulfate as initiator.

Documents such as EP-A 745 623 (see also the literature cited therein) describe the use of specific redox systems or azo initiators.

Although such initiator systems do indeed lead to graft polymers which lead to good properties for specific requirements in thermoplastic moulding compositions, good strength values at high and low temperatures while retaining the other properties are not, however, achieved to a sufficient extent.

The invention provides thermoplastic moulding compositions of the ABS type containing A) at least one elastic-thermoplastic graft polymer obtained by radical emulsion polymerization of resin-forming vinyl monomers, preferably of styrene or acrylonitrile, wherein styrene and/or acrylonitrile may be wholly or partially replaced by α-methylstyrene, methyl methacrylate or N-phenylmaleinimide, in the presence of rubber present in latex form with a glass transition temperature ≦0° C. using an initiator combination comprising a specific azo compound and a persulfate compound and B) at least one copolymer comprising styrene and acrylonitrile, wherein styrene and/or acrylonitrile may be wholly or partially replaced by α-methylstyrene or methyl methacrylate or N-phenylmaleinimide, characterized in that the graft polymer A) is produced by feed of the monomers to the rubber latex, at the start of the graft polymerization reaction the specific azo compound is added in quantities of 0.2 to 3 wt. %, preferably 0.3 to 2.5 wt. % and particularly preferably 0.5 to 2 wt. % (related to the monomers metered in up to the time of the persulfate compound addition in each case), after a monomer addition of 10 to 95 wt. %, preferably 20 to 85 wt. %, particularly preferably 20 to 80 wt. %, in particular 30 to 75 wt. % and most particularly preferably 35 to 70 wt. % (related to total monomer quantity in each case) a persulfate compound is added in quantities of 0.05 to 1.5 wt. %, preferably 0.08 to 1.2 wt. % and particularly preferably 0.1 to 1.0 wt. % (related to the monomers metered in from the time of the persulfate compound addition in each case) and the polymerization is brought to an end, wherein a compound of formula (III)

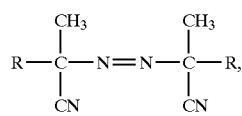

(III)

where R=$CH_3$, $C_2H_5$, $C_3H_7$, $C_4H_9$,
wherein the isomer groups n-$C_3H_7$, i-$C_3H_7$, n-$C_4H_9$, i-$C_4H_9$, t-$C_4H_9$ are included,
or a mixture thereof is used as azo compound.

In principle all rubber-like polymers present in emulsion form, with a glass transition temperature below 0° C. are suitable as rubbers for the production of the elastic-thermoplastic graft polymers according to the invention.

Examples of those which may be used are:

diene rubbers, i.e. homopolymers of conjugated dienes with 4 to 8 C atoms such as butadiene, isoprene, chloroprene or their copolymers with up to 60 wt. %, preferably up to 30 wt. %, of a vinyl monomer, e.g. acrylonitrile, methacrylonitrile, styrene, α-methylstyrene, halogen styrenes, $C_1$–$C_4$ alkyl styrenes, $C_1$–$C_8$ alkyl acrylates, $C_1$–$C_8$ alkyl methacrylates, alkylene glycol diacrylates, alkylene glycol dimethacrylates, divinyl benzene;

acrylate rubbers, i.e. homo and copolymers of $C_1$–$C_{10}$ alkyl acrylates, e.g. homopolymers of ethyl acrylate, butyl acrylate or copolymers with up to 40 wt. %, preferably not more than 10 wt. %, of monovinyl monomers, e.g. styrene, acrylonitrile, vinyl butyl ether, acrylic acid (ester), methacrylic acid (ester), vinyl sulfonic acid. Those acrylate rubber homo and/or copolymers are preferably used which contain 0.01 to 8 wt. % of divinyl or polyvinyl compounds and/or N-methylolacrylamide and/or N-methylolmethacrylamide or other compounds which act as crosslinking agents, e.g. divinyl benzene, triallyl cyanurate.

Polybutadiene rubbers, SBR rubbers with up to 30 wt. % of styrene incorporated by polymerization and acrylate rubbers, particularly those which have a core/shell structure, such as are described in DE-OS 3 006 804 for example, are preferred.

Latices with average particle diameters $d_{50}$ of 0.05 to 2.0 µm, preferably 0.08 to 1.0 µm and particularly preferably 0.1 to 0.5 µm, are considered for producing the graft polymers according to the invention. The gel contents of the rubbers used may be varied in wide limits, preferably they are between 30 and 95 wt % (determined by the wire cage method in toluene, (cf. Houben-Weyl, Methoden der Organischen Chemie, Makromolekulare Stoffe, Part 1, p. 307 (1961), Thieme Verlag publishers, Stuttgart)).

Most particularly preferred are mixtures of rubber latices with a) average particle diameters $d_{50} \leq 320$ nm, preferably 260 to 310 nm, and gel contents $\leq 70$ wt. %, preferably 40 to 65 wt. % and b) average particle diameters $d_{50} \geq 370$ nm, preferably 380 to 450 nm, and gel contents $\geq 70$ wt. %, preferably 75 to 90 wt. %.

The rubber latex (a) preferably has a spread of the particle size distribution of 30 to 100 nm, particularly preferably 40 to 80 nm, the rubber latex (b) one of 50 to 500 nm, particularly preferably 100 to 400 nm (measured in each case as the $d_{90}$–$d_{10}$ value from the integral particle size distribution).

The mixtures contain the rubber latices (a) and (b) preferably in the weight ratio 90:10 to 10:90, particularly preferably 60:40 to 30:70 (related in each case to the particular solids content of the latices).

The average particle diameter is determined by ultracentrifuge (cf. W. Scholtan, H. Lange: Kolloid-Z. u Z. Polymere 250, p. 782–796 (1972)).

The values quoted for the gel content relate to the determination by the wire cage method in toluene (cf. Houben-Weyl, Methoden der Organischen Chemie, Makromolekulare Stoffe, Part 1, p. 307 (1961), Thieme Verlag publishers, Stuttgart).

The rubber latices used may be produced by emulsion polymerization, the requisite reaction conditions, auxiliary substances and techniques are known in principle.

It is also possible initially to produce a fine-particle rubber polymer by known methods and then agglomerate it in known manner to set the required particle size. Relevant techniques are described (cf EP-PS 0 029 613; EP-PS 0 007 810; DD-PS 144 415; DE-AS 12 33 131; DE-AS 12 58 076; DE-OS 21 01 650; U.S. Pat. No. 1,379,391).

The so-called seed polymerization method may also be used, in which a fine-particle butadiene polymer is initially produced, for example, and then further polymerized to larger particles by further conversion with monomers containing butadiene.

The conventional anionic emulsifiers such as alkyl sulfates, alkyl sulfonates, aralkyl sulfonates, soaps of saturated or unsaturated fatty acids (e.g. oleic acid, stearic acid) and alkaline disproportionated or hydrogenated abietic or tall oil acid may be used as emulsifiers, preferably emulsifiers with carboxyl group (e.g. salts of $C_{10}$–$C_{18}$ fatty acids, disproportionated abietic acid) are used.

In principle rubber polymer latices may also be produced by emulsifying finished rubber polymers in aqueous media (cf. Japanese patent application 55 125 102).

Virtually all compounds which may be polymerized in emulsion to produce thermoplastic resins, e.g. aromatic vinyl compounds of formula (I) or compounds of formula (II) and/or mixtures thereof,

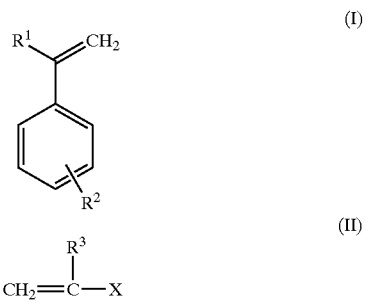

in which
$R^1$ is hydrogen or methyl,
$R^2$ is hydrogen, halogen or alkyl with 1 to 4 carbon atoms in ortho, meta or para position,
$R^3$ is hydrogen or methyl and
X is CN, $R^4$OOC or $R^5R^6$NOC—,
wherein
$R^4$ stands for hydrogen or alkyl with 1 to 4 carbon atoms and
$R^5$ and $R^6$ independently of each other stand for hydrogen, phenyl or alkyl with 1 to 4 carbon atoms, are suitable as graft monomers which are polymerized in the presence of the rubber-like polymers present in emulsion form.

Examples of compounds of formula (I) are styrene, α-methylstyrene, p-methylstyrene and vinyl toluene. Examples of compounds of formula (II) are acrylonitrile and methyl methacrylate. Further suitable monomers are vinyl acetate and N-phenylmaleinimide for example.

Preferred monomers are mixtures of styrene and acrylonitrile, α-methylstyrene and acrylonitrile, of styrene, acrylonitrile and methyl methacrylate and combinations of these monomer mixtures with N-phenylmaleinimide.

Preferred graft polymers A) according to the invention are those which are obtained by graft polymerization of styrene and acrylonitrile in the weight ratio 90:10 to 50:50, preferably 80:20 to 65:35 (wherein styrene may be wholly or partially replaced by α-methylstyrene or methyl methacrylate) in the presence of such quantities of rubber, preferably polybutadiene, that graft polymers with rubber contents of 20 to 80 wt. %, preferably 30 to 75 wt. % and particularly preferably 35 to 70 wt. % result.

The graft polymers A) are produced according to the invention in such a way that a specific azo compound is added to the rubber latex and/or to the rubber latex mixture at the start of the graft reaction.

Suitable specific azo compounds which are preferred are those of general formula (III)

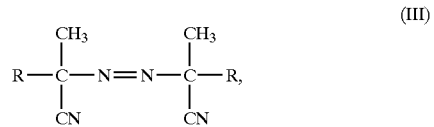

where R=$CH_3$, $C_2H_5$, $C_3H_7$, $C_4H_9$,
wherein the isomer groups n-$C_3H_7$, i-$C_3H_7$, n-$C_4H_9$, i-$C_4H_9$, t-$C_4H_9$ are included.

The compound of formula (III) where R=$C_2H_5$ is particularly preferred.

The quantities of azo compound used are 0.2 to 3 wt. %, preferably 0.3 to 2.5 wt. % and particularly preferably 0.5 to 2 wt. % (related in each case to the monomers metered in up to the time of the persulfate compound addition).

The graft monomers are then metered in and after an added quantity of 10 to 95 wt. %, preferably 20 to 85 wt. %, particularly preferably 20 to 80 wt. %, in particular 30 to 75 wt. % and most particularly preferably 35 to 70 wt. % (related to total monomer quantity in each case) is achieved, at least one persulfate compound is added in quantities of 0.05 to 1.5 wt. %, preferably 0.08 to 1.2 wt. % and particularly preferably 0.1 to 1.0 wt. % (related in each case to the monomers metered in from the start of the persulfate compound addition).

Examples of suitable persulfate compounds are sodium peroxodisulfate, potassium peroxodisulfate, ammonium peroxodisulfate, the preferred persulfate compound is potassium peroxodisulfate.

Both the azo compound and the persulfate compound are conventionally used in the form of aqueous solutions, aqueous emulsions, aqueous suspensions or other aqueous dispersions.

The remaining monomers are then metered in and polymerization is brought to an end.

The invention further provides the process for producing graft rubbers, wherein
i) the graft monomers are metered into the rubber latex,
ii) the azo compound is added at the start of the graft polymerization reaction in quantities of 0.2 to 3 wt. % (related to the monomers metered in up to the time of the persulfate compound addition)
iii) after a monomer addition of 10 to 95 wt. % (related to the total monomer quantity) a persulfate compound is added in quantities of 0.05 to 1.5 wt. % (related to the monomers metered in from the time of the persulfate compound addition) and
iv) the polymerization reaction is brought to an end, wherein a compound of formula (III)

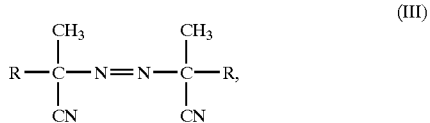

(III)

where R=$CH_3$, $C_2H_5$, $C_3H_7$, $C_4H_9$,
wherein the isomer groups n-$C_3H_7$, i-$C_3H_7$, n-$C_4H_9$, i-$C_4H_9$, t-$C_4H_9$ are include,
is used as azo compound.

The reaction temperature in the production according to the invention of the graft rubbers A) may be varied in wide limits. It is 25° C. to 160° C., preferably 40° C. to 90° C.; most particularly preferably the temperature at the start of monomer metering differs from the temperature at the end of monomer metering by 20° C. maximum, preferably 10° C. maximum and particularly preferably 5° C. maximum.

In addition, molecular weight regulators may be used in the graft polymerization, preferably in quantities of 0.05 to 2 wt. %, particularly preferably in quantities of 0.1 to 1 wt. % (related in each case to the total monomer quantity).

A procedure preferred according to the invention is to add molecular weight regulators only in the reaction stage after addition of the persulfate compound and to avoid any regulator addition in the reaction stage before the addition of the persulfate compound.

Examples of suitable molecular weight regulators are n-dodecylmercaptan, t-dodecylmercaptan, dimeric α-methylstyrene, terpinolene and mixture combinations comprising these compounds.

The above-mentioned compounds may be used as emulsifier in the graft polymerization reaction, emulsifiers with carboxyl groups are preferred.

The graft rubber latex A) is prepared by known methods, such as by spray-drying or by addition of salts and/or acids, washing of the precipitation products and drying of the powder.

Copolymers of styrene and acrylonitrile in the weight ratio 90:10 to 50:50 are preferably used as vinyl resins B), wherein styrene and/or acrylonitrile may be wholly or partially replaced by α-methylstyrene and/or methyl methacrylate; in quantitative terms up to 30 wt. % (related to vinyl resin) of a further monomer from the series maleic anhydride, maleic imide, N-(cyclo)-alkylmaleinimide, N-(alkyl)-phenylmaleinimide may be optionally co-used.

The weight average molecular weights ($\overline{M}_w$) of these resins may vary within wide limits, preferably they are between approx. 40,000 and 200,000, particularly preferably between 50,000 and 150,000.

Particulars of the production of these resins are described in DE-AS 2 420 358 and DE-AS 2 724 360 for example. Resins produced by bulk and/or solution polymerization and by suspension polymerization have proved particularly successful.

The content of the elastic-thermoplastic graft polymer (A) in the moulding compositions according to the invention may vary within wide limits; preferably it is 10 to 80 wt. %, particularly preferably 20 to 75 wt. %.

The required and/or appropriate additives such as antioxidants, UV stabilizers, peroxide decomposers, anti-static agents, lubricants, mould release agents, flameproofing agents, filling or reinforcing material (glass fibres, carbon fibres etc.) and colorants may be added to the moulding compositions according to the invention on production, preparation, further processing and final moulding.

Final moulding may be undertaken on conventional commercial processing equipment and comprises, for example, processing by injection moulding, sheet extrusion with optionally subsequent thermoforming, cold forming, extrusion of pipes and profiles or calender processing.

The moulding compositions of the ABS type according to the invention may be mixed with other polymers. Suitable blend partners are selected, for example, from at least one polymer, chosen from the polycarbonates, polyesters, polyester carbonates and polyamides group.

Suitable thermoplastic polycarbonates and polyester carbonates are known (cf., for example, DE-AS 1 495 626, DE-OS 2 232 877, DE-OS 2 703 376, DE-OS 2 714 544, DE-OS 3 000 610, DE-OS 3 832 396, DE-OS 3 077 934), and may be produced, for example, by reaction of diphenols of formulae (IV) and (V)

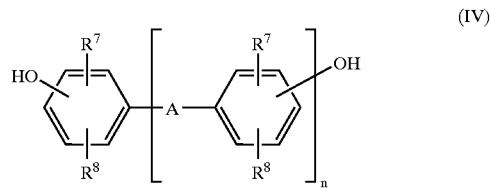

(IV)

-continued

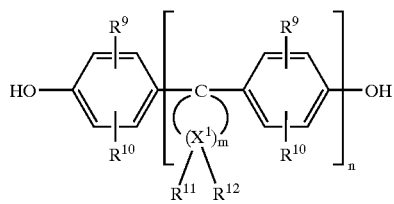

(V)

in which
- A is a single bond, $C_1$–$C_5$-alkylene, $C_2$–$C_5$-alkylidene, $C_5$–$C_6$-cycloalkylidene, —O—, —S—, —SO—, —SO$_2$— or —CO—,
- $R^7$ and $R^8$ independently of each other stand for hydrogen, methyl or halogen, particularly for hydrogen, methyl, chlorine or bromine,
- $R^9$ and $R^{10}$ independently of each other stand for hydrogen, halogen preferably chlorine or bromine, $C_1$–$C_8$-alkyl, preferably methyl, ethyl, $C_5$–$C_6$-cycloalkyl, preferably cyclohexyl, $C_6$–$C_{10}$-aryl, preferably phenyl, or $C_2$–$C_{12}$-aralkyl, preferably phenyl-$C_1$–$C_4$-alkyl, particularly benzyl,
- m is a whole number from 4 to 7, preferably 4 or 5,
- n is 0 or 1,
- $R^{11}$ and $R^{12}$ can be individually selected for each $X^1$ and independently of each other stand for hydrogen or $C_1$–$C_6$-alkyl and
- $X^1$ stands for carbon, with carbonic acid halides, preferably phosgene, and/or with aromatic dicarboxylic acid dihalides, preferably benzene dicarboxylic acid dihalides, by phase boundary polycondensation or with phosgene by polycondensation in homogeneous phase (the so-called pyridine method), wherein the molecular weight may be set in known manner by means of a corresponding quantity of known chain terminators.

Examples of suitable diphenols of formulae (IV) and (V) are hydroquinone, resorcinol, 4,4'-dihydroxy diphenyl, 2,2-bis-(4-hydroxyphenyl)-propane, 2,4-bis-(4-hydroxyphenyl)-2-methyl butane, 2,2-bis-(4-hydroxy-3,5-dimethylphenyl)-propane, 2,2-bis-(4-hydroxy-3,5-dichlorophenyl)-propane, 2,2-bis-(4hydroxy-3,5-dibromophenyl)-propane, 1,1-bis-(4-hydroxyphenyl)-cyclohexane, 1,1-bis-(4-hydroxyphenyl)-3,3,5-trimethyl cyclohexane, 1,1-bis-(4-hydroxyphenyl)-3,3-dimethyl cyclohexane, 1,1-bis-(4-hydroxyphenyl)-3,3,5,5,-tetramethyl cyclohexane or 1,1-bis-(4-hydroxyphenyl)-2,4,4,-trimethyl cyclopentane.

Preferred diphenols of formula (IV) are 2,2-bis-(4-hydroxyphenyl)-propane and 1,1-bis-(4-hydroxyphenyl)-cyclohexane, the preferred phenol of formula (V) is 1,1-bis-(4-hydroxyphenyl)-3,3,5-trimethyl cyclohexane.

Mixtures of diphenols may also be used.

Examples of suitable chain terminators are phenol, p-tert.-butyl phenol, long-chain alkyl phenols such as 4-(1,3-tetramethyl-butyl)phenol according to DE-OS 2 842 005, monoalkyl phenols, dialkyl phenols with a total of 8 to 20 C atoms in the alkyl substituents according to DE-OS 3 506 472, such as p-nonyl phenol, 2,5-di-tert.-butyl phenol, p-tert.-octyl phenol, p-dodecyl phenol, 2-(3,5-dimethylheptyl)-phenol and 4-(3,5-dimethylheptyl)-phenol. The required quantity of chain terminators is generally 0.5 to 10 mole %, related to the sum of the diphenols (IV) and (V).

The suitable polycarbonates and/or polyester carbonates may be linear or branched; branched products are preferably obtained by the incorporation of 0.05 to 2.0 mole %, related to the sum of the diphenols used, of tri- or more than tri-functional compounds such as those with three or more than three phenolic OH groups.

The suitable polycarbonates and/or polyester carbonates may contain aromatically bound halogen, preferably bromine and/or chlorine; preferably they are halogen-free.

They have average molecular weights ($\overline{M}_w$, weight average), determined by ultracentrifuging or light-scattering measurement for example, of 10,000 to 200,000, preferably of 20,000 to 80,000.

Suitable thermoplastic polyesters are preferably polyalkylene terephthalates, i.e. reaction products of aromatic dicarboxylic acids or their reactive derivatives (e.g. dimethyl esters or anhydrides) and aliphatic, cycloaliphatic or arylaliphatic diols and mixtures of such reaction products.

Preferred polyalkylene terephthalates may be produced by known methods (Kunststoff-Handbuch, Vol. VIII, p. 695 ff., Carl Hanser Verlag publishers, Munich 1973) from terephthalic acids (or their reactive derivatives) and aliphatic or cycloaliphatic diols with 2 to 10 C atoms.

In preferred polyalkylene terephthalates 80 to 100, preferably 90 to 100 mole % of the dicarboxylic acid groups, terephthalic acid groups and 80 to 100, preferably 90 to 100 mole % of the diol groups are ethylene glycol and/or butane-1,4-diol groups.

In addition to ethylene glycol and/or butane-1,4-diol groups the preferred polyalkylene terephthalates may contain 0 to 20 mole % of groups of other aliphatic diols with 3 to 12 C atoms or cycloaliphatic diols with 6 to 12 C atoms, e.g. groups of propane-1,3-diol, 2-ethylpropane-1,3-diol, neopentyl glycol, pentane-1,5-diol, hexane-1,6-diol, cyclohexanedi-1,4-methanol, 3-methylpentane-1,3- and 1,6-diol, 2-ethyl hexane-1,3-diol, 2,2-diethylpropane-1,3-diol, hexane-2,5-diol, 1,4-di(β-hydroxyethoxy)-benzene, 2,2-bis-(4-hydroxycyclohexyl)-propane, 2,4-dihydroxy-1,1,3,3-tetramethyl cyclobutane, 2,2-bis-(3-β-hydroxyethoxyphenyl)-propane and 2,2-bis-(4-hydroxypropoxybenyl)-propane (DE-OS 2 407 647, 2 407 776, 2 715 932).

The polyalkylene terephthalates may be branched by incorporation of relatively small quantities of trihydric or tetrahydric alcohols or tribasic or tetrabasic carboxylic acids, as described in DE-OS 1 900 270 and U.S. Pat. No. 3 692 744. Examples of preferred branching agents are trimesic acid, trimellitic acid, trimethylol ethane and propane and pentaerythritol. It is advisable to use no more than 1 mole % of the branching agent, related to the acid component.

Particularly preferred are polyalkylene terephthalates which have been produced solely from terephthalic acid and its reactive derivatives (e.g. its dialkyl esters) and ethylene glycol and/or butane-1,4-diol and mixtures of these polyalkylene terephthalates.

Preferred polyalkylene terephthalates are also copolyesters which are produced from at least two of the abovementioned alcohol components; particularly preferred copolyesters are poly-(ethylene glycol butane-1,4-diol) terephthalates.

The polyalkylene terephthalates which are preferably suitable, generally have an intrinsic viscosity of 0.4 to 1.5 dl/g, preferably 0.5 to 1.3 dl/g, in particular 0.6 to 1.2 dl/g, measured in phenol/o-dichlorobenzene (1:1 parts by weight) at 25° C. in each case.

Suitable polyamides are known homopolyamides, copolyamides and mixtures of these polyamides. They may be partly crystalline and/or amorphous polyamides.

Polyamide-6, polyamide-6,6, mixtures and corresponding copolymers comprising these components are suitable as partly crystalline polyamides. Partly crystalline polyamides which are also considered are ones whose acid component consists wholly or partially of terephthalic acid and/or isophthalic acid and/or suberic acid and/or sebacic acid and/or azelaic acid and/or adipic acid and/or cyclohexane dicarboxylic acid, whose diamine component consists wholly or partially of m-and/or p-xylylene diamine and/or hexamethylene diamine and/or 2,2,4-trimethylhexamethylene diamine and/or 2,2,4-trimethylhexamethylene diamine and/or isophoron diamine and whose composition is known in principle.

Furthermore, polyamides may be mentioned which are produced wholly or partially from lactams with 7–12 C atoms in the ring, optionally with the co-use of one or more of the above-mentioned starting components.

Particularly preferred partly crystalline polyamides are polyamides-6 and polyamide 6,6 and their mixtures. Known products may be used as amorphous polyamides. They are obtained by polycondensation of diamines such as ethylene diamine, hexamethylene diamine, decamethylene diamine, 2,2,4- and/or 2,4,4-trimethylhexamethylene diamine, m- and/or p-xylylene diamine, bis-(4-aminocyclohexyl)-methane, bis-(4-aminocyclohexyl)-propane, 3,3'-dimethyl-4,4'-diamino-dicyclohexylmethane, 3-aminomethyl,3,5,5,-trimethylcyclohexylamine, 2,5- and/or 2,6-bis-(aminomethyl)-norbornene and/or 1,4-diaminomethyl cyclohexane with dicarboxylic acids such as oxalic acid, adipic acid, azelaic acid, decane dicarboxylic acid, heptadecane dicarboxylic acid, 2,2,4- and/or 2,4,4-trimethyl adipic acid, isophthalic acid and terephthalic acid.

Copolymers which are obtained by polycondensation of several monomers are also suitable, further copolymers which are produced with addition of aminocarboxylic acids such as ε-aminocaproic acid, ω-aminoundecanoic acid or ω-aminolauric acid or their lactams.

Particularly suitable amorphous polyamides are the polyamides produced from isophtbalic acid, hexamethylene diamine and further diamines such as 4,4'-diaminodicyclohexylmethane, isophoron diamine, 2,2,4- and/or 2,4,4-trimethylhexamethylene diamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurinlactam; or from terephthalic acid and the isomer mixture comprising 2,2,4- and/or 2,4, 4triethylhexamethylene diamine.

Instead of the pure 4,4'-diaminodicyclohexylmethane, mixtures of the positional isomer diaminodicyclohexyl-methanes may be used, which are composed of 70 to 99 mole % of the 4,4'-diamino isomer 1 to 30 mole % of the 2,4'-diamino isomer 0 to 2 mole % of the 2,2'-diamino isomer and optionally correspondingly more highly condensed diamines which are obtained by hydrogenation of technical grade diaminodiphenylmethane. Up to 30% of the isophthalic acid may be replaced by terephthalic acid.

If at least one polymer, selected from the polycarbonates, polyesters, polyester carbonates and polyamides group, is used in addition, the quantity thereof is up to 500 parts by weight, preferably up to 400 parts by weight and particularly preferably up to 300 parts by weight (related to 100 parts by weight of A+B in each case).

In the examples which follow, the parts quoted are parts by weight at all times and the percentages quoted are percentages by weight, unless otherwise stated.

Examples

Example 1

(According to the Invention)

50 parts by weight (calculated as solids) of a polybutadiene latex mixture (50 wt. % with an average particle diameter $d_{50}$ of 421 nm and a gel content of 85 wt. % and 50 wt. % with an average particle diameter $d_{50}$ of 276 nm and a gel content of 47 wt. %, both produced by radical polymerization) are brought to a solids content of approx. 20 wt. % with water, after which heating to 65° C. takes place. Thereafter, 0.25 parts by weight of the compound of formula (III) where R=$C_2H_5$ (Vazo 67, DuPont Deutschland GmbH, Bad Homburg v.d.H.) are added accompanied by stirring.

25 parts by weight of a monomer mixture comprising 73 wt. % of styrene and 27 wt. % of acrylonitrile and 0.075 parts by weight of tert.-dodecylmercaptan are then evenly metered in within 2 hours.

0.25 parts by weight of potassium peroxodisulfate (dissolved in water) are then added and subsequently 25 parts by weight of a monomer mixture comprising 73 wt. % of styrene and 27 wt. % of acrylonitrile and 0.075 parts by weight of tert.-dodecylmercaptan are evenly metered in within 2 hours.

Parallel to the monomers 1 part by weight (calculated as solid substance) of the sodium salt of a rosin acid mixture (Dresinate 731, Abieta Chemie GmbH, Gersthofen, dissolved in water which has been made alkaline) is metered in over 4 hours.

After a 4-hour post-reaction time, after addition of approx. 1 part by weight of a phenolic anti-oxidant the graft latex is coagulated with a magnesium sulfate/acetic acid mixture and after washing with water the resulting powder is vacuum-dried at 70° C. 40 parts by weight of this graft polymer are mixed with 60 parts by weight of a styrene/acrylonitrile copolymer resin (72:28,$\overline{M}_w$approx. 115,000, $\overline{M}_w/\overline{M}_n-1 \leq 2$), 2 parts by weight of ethylene diamine bis-stearylamide and 0.1 parts by weight of a silicone oil in an internal mixer and then processed into test bodies.

The Following Data were Determined

Notch impact strength at room temperature ($a_k^{RT}$) and at $-40°$ C. ($a_k^{-40° \, C.}$) to ISO 180/1A (unit: kJ/m$^2$), Ball-puncture resistance ($H_c$) to DIN 53 456 (unit: N/mm$^2$), thermoplastic flowability was assessed by measuring the necessary filling pressure at 240° C. (unit: bars) (see F Johannaber, Kunststoffe 74 (1984), 1, pages 2–5), the crude shade (colour in the non-dyed state) was visually assessed according to the gradings:

++ very light
+ light
○ medium
- dark
-- very dark.

The results are summarized in Table 1.

Example 2

(According to the Invention)

Example 1 is repeated, wherein 0.15 parts by weight of tert.-dodecylmercaptan were metered in together with the monomers, only after the addition of potassium peroxodisulfate.

Example 3

(Comparison)

Example 1 is repeated, wherein instead of the addition of the compound of formula (III) where R=$C_2H_5$, 0.25 parts by weight of potassium peroxodisulfate (dissolved in water) are added after the heating of the rubber latex mixture.

Example 4

(Comparison)

Example 1 is repeated, wherein after the heating of the rubber latex mixture, 0.25 parts by weight of potassium peroxodisulfate (dissolved in water) are added instead of the addition of the compound of formula (III) where $R=C_2H_5$ and after 2 hours' monomer metering 0.25 parts by weight of the compound of formula (III) where $R=C_2H_5$ are added instead of the potassium peroxodisulfate addition.

Example 5 (According to the Invention)

50 parts by weight (calculated as solids) of an anionically emulsified polybutadiene latex produced by radical polymerization and with a particle diameter $d_{50}$ of 421 nm and a gel content of 85 wt. % are adjusted to a solids content of approx. 20 wt. % with water and then heated to 65° C.

The graft reaction then takes place in a manner similar to the description in Example 1.

Example 6

(Comparison)

Example 5 is repeated, wherein the procedure described in Example 3 is used.

Example 7

(According to the Invention)

50 parts by weight (calculated as solids) of a rubber latex, obtained by chemical agglomeration from a base latex with an average particle diameter $d_{50}$ of 98 nm, with an average particle diameter $d_{50}$ of 276 nm and a gel content of 93 wt. % are adjusted to a solids content of approx. 25 wt. % by addition of water and then heated to 63° C. 0.3 parts by weight of the compound of formula (III) where $R=CH_3$ (Vazo 64, DuPont) are then added accompanied by stirring.

Within 1.5 hours, 30 parts by weight of a monomer mixture comprising 70 wt. % of styrene and 30 wt. % of acrylonitrile and 0.2 parts by weight of tert.-dodecylmercaptan are then evenly metered in.

0.25 parts by weight of potassium peroxodisulfate (dissolved in water) are then added and then, within 1.5 hours, 20 parts by weight of a monomer mixture comprising 70 wt. % of styrene and 30 wt. % of acrylonitrile and 0.3 parts by weight of tert.-dodecylmercaptan are evenly metered in.

After a 3-hour post-reaction time the graft latex is coagulated with a magnesium sulfate solution, after addition of approx. 1.5 parts by weight of an anti-oxidant, and after washing with water the resulting powder is vacuum-dried at 70° C.

40 parts by weight of this graft polymer are mixed with 60 parts by weight of a styrene/acrylonitrile copolymer resin (72:28, $\overline{M}_w$ approx. 138,000), 1 part by weight of pentaerythritol tetrastearate and 0.15 parts by weight of a silicone oil in an internal mixer and then processed into test bodies.

Example 8

(Comparison)

Example 7 is repeated, wherein a procedure similar to Example 3 is used.

From the test values summarized in Table 1 it can be seen that only the moulding compositions according to the invention exhibit an increase in the strength values with no negative influence on hardness and processability. Very good crude colour values are also obtained.

TABLE 1

Test data for the moulding compositions tested

| Example | $a_k^{RT}$ (kJ/m²) | $a_k^{-40° C.}$ (kJ/m²) | $H_c$ (N/mm²) | Filling pressure (bars) | Crude colour |
|---|---|---|---|---|---|
| 1 | 42 | 26 | 91 | 158 | ++ |
| 2 | 43 | 26 | 91 | 152 | ++ |
| 3 (comp.) | 35 | 26 | 92 | 148 | – |
| 4 (comp.) | 36 | 27 | 90 | 154 | O |
| 5 | 47 | 28 | 93 | 152 | ++ |
| 6 (comp.) | 43 | 25 | 93 | 150 | – |
| 7 | 37 | 12 | 94 | 200 | ++ |
| 8 (comp.) | 30 | 11 | 92 | 198 | – |

What is claimed is:

1. A thermoplastic molding composition containing a two-phase plastic that includes B) a thermoplastic copolymer forming a matrix as an external phase, produced from the resin forming vinyl monomers styrene and acrylonitrile, in which the styrene may wholly or partially be replaced by α-methylstyrene or by methylmethacrylate, and A) at least one graft polymer produced by a grafting reaction of one or more of the monomers referred to in B) on a homopolymeric or copolymeric butadiene as a graft base, the graft polymer forming a dispersed phase in the matrix said A) being a product of a radical emulsion polymerization process wherein said resin forming vinyl monomers are polymerized in the presence of rubber in latex form having a glass transition temperature $≤0°$ C., said polymerization initiated by a combination of a persulfate compound and at least one azo compound conforming to formula (III)

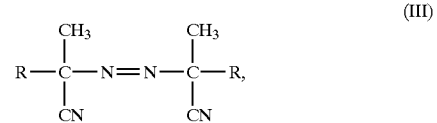

(III)

where R denotes a member selected from the group consisting of $CH_3$, $C_2H_5$, $C_3H_7$, $C_4H_9$, $n-C_3H_7$, $i-C_3H_7$, $n-C_4H_9$, $i-C_4H_9$, and $t-C_4H_9$, and wherein process comprise in sequence feeding a first mixture that contains said azo compound and a first amount of monomers to said latex to form a reaction mixture, said first amount being 10 to 95 percent relative to the weight of the total amount of said monomers entailed in said polymerization, said azo compound being in an amount of 0.2 to 3 percent relative to the weight of said first amount, and introducing to the reaction mixture a second mixture that contains said persulfate compound and a second amount of monomers, said second amount being 5 to 90 percent relative to the weight of the total amount of said monomers entailed in said polymerization, the amount of said persulfate compound being 0.05 to 1.5 percent relative to the weight of said second amount.

2. Thermoplastic moulding compositions according to claim 1, characterized in that component A) is contained in quantities of 10 to 80 wt. %.

3. Thermoplastic moulding compositions according to claim 1, characterized in that the rubber according to Component A is a mixture of at least two rubber latices with a) an average particle diameter $d_{50}≤320$ nm and a gel content $≤70$ wt. % and b) an average particle diameter $d_{50}≥370$ nm and a gel content $≥70$ wt. %.

4. Thermoplastic moulding compositions according to claim 1, characterized in that the elastic-thermoplastic graft polymer A) has a rubber content of 20 to 80 wt. %.

5. Thermoplastic moulding compositions according to claim 1, characterized in that the resin-forming monomers in the production of the graft polymer A) are styrene and acrylonitrile.

6. Thermoplastic moulding compositions according to claim 1, characterized in that in the production of the graft polymer A), polymerization takes place before addition of the persulfate compound with no addition of molecular weight regulators and polymerization takes place after addition of the persulfate compound with addition of molecular weight regulators.

7. Thermoplastic moulding compositions according to claim 1, characterized in that the compound

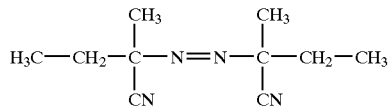

is used as compound to produce the graft polymer A).

8. Thermoplastic moulding compositions according to claim 1, characterized in that potassium peroxodisulfate is used as persulfate compound for the production of the graft polymer A).

9. Thermoplastic moulding compositions according to claim 1, characterized in that the co-polymer B) is composed of monomers selected from styrene, α-methylstyrene, acrylonitrile, methyl methacrylate, maleic anhydride, N-phenylmaleinimide or mixtures thereof.

10. Thermoplastic moulding compositions according to claim 1, additionally containing at least one resin selected from the polycarbonates, polyester carbonates, polyesters and polyamides group.

11. Moulded parts, produced from thermoplastic moulding compositions according to claim 1.

12. A method of using the composition of claim 1 comprising preparing an article by injection molding.

13. A process for producing rubber-containing graft polymers by emulsion polymerization using an initiator combination that includes an azo compound and a persulfate compound, comprising i) metering graft monomers into rubber latex to form a polymerization mixture and start a graft polymerization reaction, ii) adding the azo compound to the polymerization mixture at the start of the graft polymerization reaction, the compound being in a quantity of 0.2 to 3% relative to the weight of the graft monomers then metered, iii) after the metering of 10 to 95 wt. % relative to the total quantity of monomers, adding a persulfate compound in an amount of 0.05 to 1.5%, relative to the weight of monomers metered in from the time of the persulfate compound addition, and iv) bringing the polymerization reaction to an end, wherein a compound of formula (III)

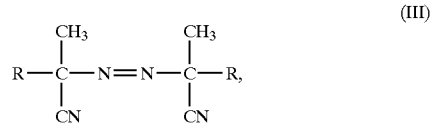

(III)

in which

R stands for $CH_3$, $C_2H_5$, $C_3H_7$, $C_4H_9$ and their isomer groups, is used as azo compound.

14. Process according to claim 13, wherein the following compound

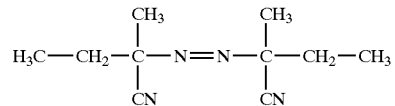

is used as azo compound.

* * * * *